United States Patent
Kruck et al.

(10) Patent No.: US 8,832,492 B1
(45) Date of Patent: *Sep. 9, 2014

(54) SYSTEMS AND METHODS FOR MANAGING APPLICATIONS

(71) Applicant: Symantec Corporation, Mountain View, CA (US)

(72) Inventors: Joshua Kruck, St. Paul, MN (US); Aaron Christensen, Roseville, MN (US); Guido Westenberg, Columbia Heights, MN (US); Girish Jorapurkar, Woodbury, MN (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,005

(22) Filed: Jan. 25, 2013

Related U.S. Application Data

(63) Continuation of application No. 12/780,056, filed on May 14, 2010, now Pat. No. 8,402,306.

(51) Int. Cl.
  *G06F 11/00* (2006.01)
  *H04L 12/56* (2006.01)
(52) U.S. Cl.
  CPC .................................. *H04L 47/70* (2013.01)
  USPC ................ 714/4.12; 714/6.12; 714/2; 714/3; 714/4.4; 709/238; 718/103
(58) Field of Classification Search
  USPC ................ 714/2, 3, 4.4, 4.12, 6.12; 709/238; 718/103
  See application file for complete search history.

(56) References Cited

U.S. PATENT DOCUMENTS

| | | | | |
|---|---|---|---|---|
| 4,825,206 | A * | 4/1989 | Brice et al. ..................... | 370/216 |
| 6,816,915 | B1 * | 11/2004 | Packer .............................. | 710/2 |
| 7,032,126 | B2 * | 4/2006 | Zalewski et al. ............. | 714/6.32 |
| 7,325,161 | B1 * | 1/2008 | Rakic et al. ..................... | 714/15 |
| 8,108,643 | B2 * | 1/2012 | Wallner et al. ................. | 711/167 |
| 8,402,306 | B1 * | 3/2013 | Kruck et al. .................... | 714/4.4 |
| 2002/0077723 | A1 * | 6/2002 | Schoop ......................... | 700/225 |
| 2002/0080445 | A1 * | 6/2002 | Falkenstein et al. .......... | 359/127 |
| 2003/0014548 | A1 * | 1/2003 | Valentine et al. ............. | 709/252 |

(Continued)

FOREIGN PATENT DOCUMENTS

JP   2010161501 A  *  7/2010

OTHER PUBLICATIONS

Panagiotis Christias; UNIX man pages : mount (1); 1994; web.archive.org/web/20070609235456/http://compute.cnr.berkeley.edu/cgi-bin/man-cgi?mount+1, as accessed on Mar. 17, 2010.

*Primary Examiner* — Loan L. T. Truong

(74) *Attorney, Agent, or Firm* — ALG Intellectual Property, LLC

(57) ABSTRACT

A method for maintaining applications may include: (1) receiving a request to recover a first application, (2) identifying a first production topology of the first application that identifies a set of resources upon which the application depends, (3) maintaining a template for transforming the first production topology of the first application into a first recovery topology for the first application, the template comprising information for mapping the first production topology to the first recovery topology, (4) applying the template to the first production topology at a first point in time to create the first recovery topology, and (5) recovering the first application to a first computing system using the first recovery topology. Various other methods, systems, and computer-readable media are also disclosed herein.

20 Claims, 7 Drawing Sheets

(56) References Cited

U.S. PATENT DOCUMENTS

| | | | |
|---|---|---|---|
| 2005/0066239 A1* | 3/2005 | Keeton et al. | 714/47 |
| 2005/0193229 A1* | 9/2005 | Garg et al. | 714/4 |
| 2005/0262254 A1* | 11/2005 | Sherwani | 709/231 |
| 2006/0069801 A1* | 3/2006 | Rich et al. | 709/232 |
| 2006/0195448 A1* | 8/2006 | Newport | 707/8 |
| 2008/0016143 A1* | 1/2008 | Bumpus et al. | 709/203 |
| 2008/0040364 A1* | 2/2008 | Li | 707/100 |
| 2008/0244419 A1* | 10/2008 | Kurpick et al. | 715/756 |
| 2009/0171730 A1* | 7/2009 | Bobak et al. | 705/8 |
| 2009/0300184 A1* | 12/2009 | Karve et al. | 709/226 |
| 2010/0017418 A1* | 1/2010 | Gopalakrishnan et al. | 707/100 |
| 2010/0165876 A1* | 7/2010 | Shukla et al. | 370/254 |
| 2010/0169860 A1* | 7/2010 | Biazetti et al. | 717/107 |
| 2010/0205576 A1* | 8/2010 | Majumder et al. | 716/18 |
| 2010/0332490 A1* | 12/2010 | Bauer et al. | 707/759 |
| 2010/0332645 A1* | 12/2010 | Duggan et al. | 709/224 |
| 2011/0066719 A1* | 3/2011 | Miryanov et al. | 709/224 |
| 2011/0179173 A1* | 7/2011 | Colrain et al. | 709/226 |

\* cited by examiner

SYSTEMS AND METHODS FOR MANAGING APPLICATIONS

CROSS REFERENCE TO RELATED APPLICATION

This application is a continuation of U.S. application Ser. No. 12/780,056, filed 14 May 2010, the disclosure of which is incorporated, in its entirety.

BACKGROUND

IT organizations today face several challenges when it comes to protecting data in their environments. The rapid growth of data volumes combined with regulatory mandates means that IT departments are now being subjected to stricter service level agreements (SLA) when it comes to backup windows, recovery time objectives (RTO), and recovery point objectives (RPO). The data protection model of yesteryear was often decentralized and primarily based on tape and physical servers. Keeping data forever is not likely to meet the data protection challenges that the IT organizations are facing today. The need for addressing these data protection challenges is driving IT organizations to explore the next generation of information management tools. These next generation tools, such as disk based backups, deduplication, virtualization, archiving, and continuous data protection, are essentially revolutionizing the world of data protection. However, additional tools often also mean additional complexity in terms of managing multiple point solutions.

In complex application environments, backup and recovery solutions may need to know which resources comprise an application. For example, when an application needs to be started or shut down (e.g., for recovery, migration, etc.), a backup solution may need to know which commands to use not only to offline the application, but the underlying storage stack. To offline a resource of a storage stack, a traditional backup solution may access user definitions of offline commands, hard coded commands, or may load a command library associated with an application. Such solutions may also require that the actor know something about the application stack (or have it defined for them via user intervention) and possibly deal with version issues between production and recovery hosts. As a result, application recovery may involve significant user input and may not be repeatable, particularly in complex computing environments. What is needed, therefore, is a more efficient and effective mechanism for managing applications.

SUMMARY

As will be described in greater detail below, the instant disclosure generally relates to systems and methods for managing applications. Embodiments of the instant disclosure may generate a description of an application (i.e., an application topology) that contains instructions for starting and stopping an application. For example, a computer-implemented method for managing applications may include discovering a set of resources (e.g., file systems, databases, etc.) upon which an application depends and generating an application topology that identifies the set of resources. Such a method may also include, for each resource in the set of resources: (1) identifying a computer-executable command programmed to change a state of the resource, and (2) including the computer-executable command in the application topology in a manner that associates the computer-executable command with the resource.

An application topology that includes commands for changing the state of resources of an application may be used in a variety of ways. For example, a recovery module may receive a request to change a state of the application and may change the state of the application by: (1) traversing the application topology to identify a resource whose state needs to be changed, (2) reading, from the application topology, the computer-executable command programmed to change the state of the resource, and (3) changing the state of the resource by executing the computer-executable command. In some embodiments, the request to change the state of the application may include a request to recover the application and changing the state of the resource may include onlining the resource. Alternatively, the request to change the state of the application may include a request to shut down the application, and changing the state of the resource may include offlining the resource. In at least one embodiment, traversing the application topology to identify a resource whose state needs to be changed may include determining that the resource is not in a predetermined state.

Various embodiments of the instant disclosure may store a set of changes for transforming a production topology into a recovery topology. For example, a computer-implemented method may include: (1) receiving a request to recover a first application, (2) identifying a first production topology of the first application that identifies a set of resources upon which the application depends, (3) maintaining a template for transforming the first production topology of the first application into a first recovery topology for the application, the template comprising information for mapping the first production topology to the first recovery topology, (4) applying the template to the first production topology at a first point in time to create the first recovery topology, and (5) recovering the first application to a first computing system using the first recovery topology.

The template may be used in a variety of recovery contexts. For example, the template may be used to recover an application at different points in time. Additionally or alternatively, the template may be used for recovering an application to a variety of different systems. In some embodiments, the template may be used to recover an application other than the application for which the template was created.

In at least one embodiment, the method may include retrieving the template, presenting at least a portion of information stored in the template to a user via a graphical user interface, and receiving, via the graphical user interface, input that modifies at least one value stored in the template.

According to certain embodiments, a system may include a discovery module programmed to discover a set of resources upon which an application may depend and generate a production topology that identifies the set of resources. The system may also include a command-identification module programmed to, for each resource in the set of resources: (1) identify a computer-executable command programmed to change a state of the resource and (2) include the computer-executable command in the production topology in a manner that associates the computer-executable command with the resource. The system may further include a template-retention module programmed to maintain a template for transforming the production topology of the application into a recovery topology for the application (the template may include information for mapping the production topology to the recovery topology). The system may also include a recovery module programmed to receive a request to recover the application, identify the production topology, apply the template to the first production topology at a first point in time to create the first recovery topology, and recover the first application to a first computing system using the first recovery topology.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
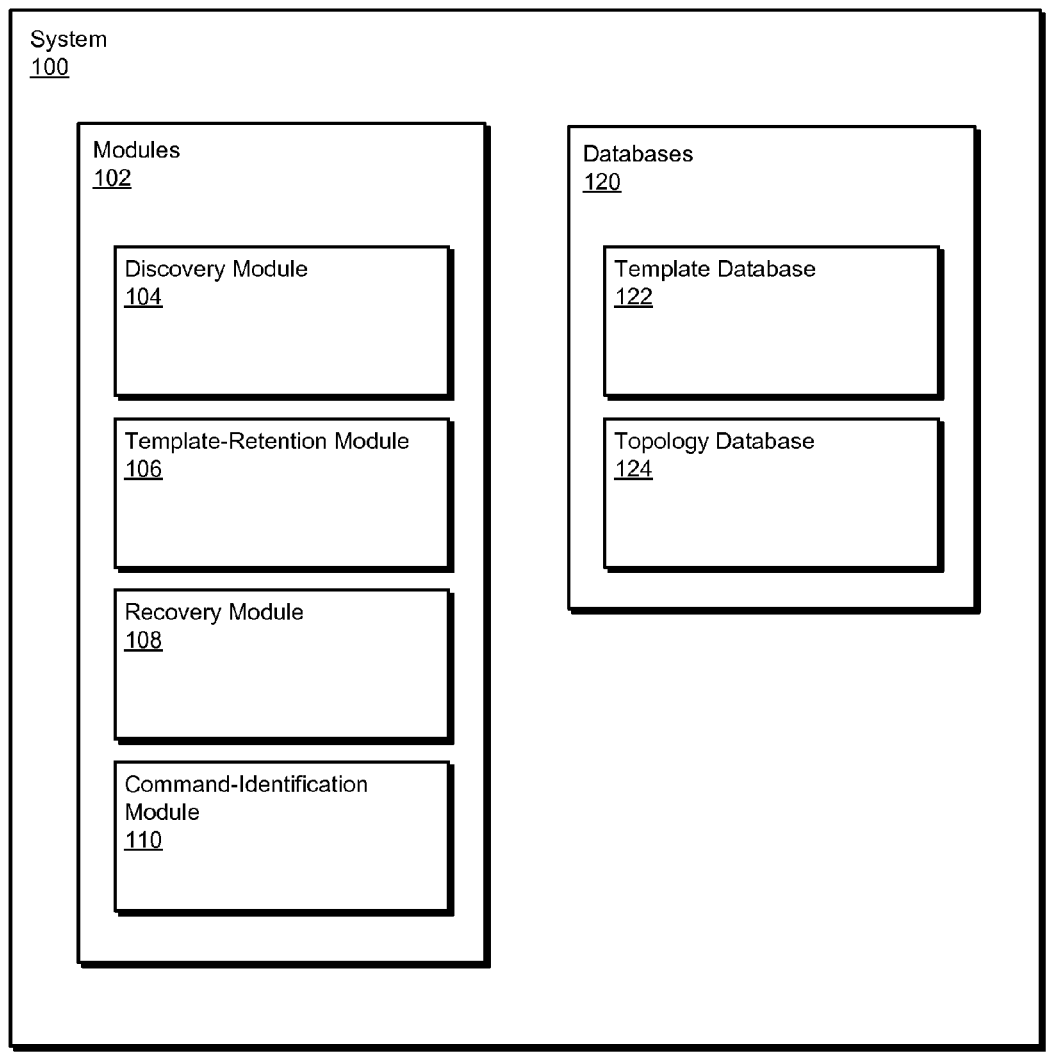
FIG. 1 is a block diagram of an exemplary system for managing applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing applications. Embodiments of the instant disclosure may generate an application topology that contains instructions for starting and stopping resources of an application. Embodiments of the instant disclosure may also store templates for mapping production topologies of applications to recovery topologies of applications.

Figure 2:
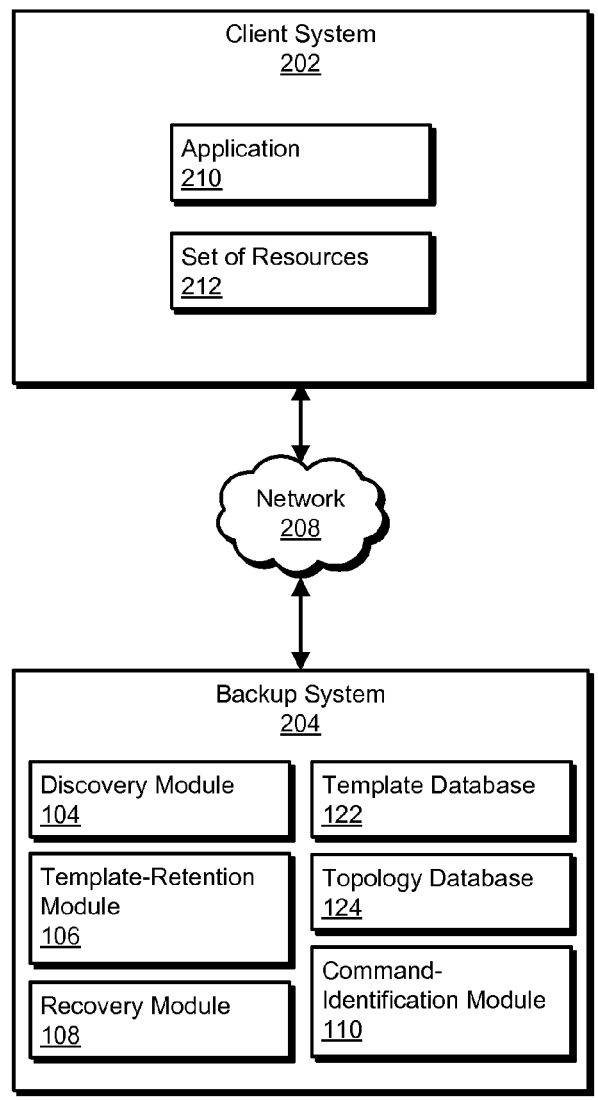
FIG. 2 is a block diagram of another exemplary system for managing applications.

The following will provide, with reference to FIGS. 1-2, detailed descriptions of exemplary systems for managing applications. Detailed descriptions of exemplary application topologies are provided in conjunction with FIG. 3. Detailed descriptions of computer-implemented methods for generating application topologies and using templates to convert production topologies to recovery topologies will also be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing applications. As illustrated in this figure, exemplary system 100 may include one or more modules 102 for performing one or more tasks. For example, and as will be explained in greater detail below, exemplary system 100 may include a discovery module 104 programmed to discover a set of resources upon which an application depends and generate a production topology that identifies the set of resources. Exemplary system 100 may also include a command-identification module 110 programmed to, for each resource in a set of resources, identify a computer-executable command programmed to change a state of the resource and include the computer-executable command in the production topology in a manner that associates the computer-executable command with the resource.

In addition, and as will be described in greater detail below, exemplary system 100 may include a template-retention module 106 programmed to maintain a template for transforming the production topology of the application into a recovery topology for the application. System 100 may also include a recovery module 108 programmed to receive a request to recover the application, identify the production topology, apply the template to the first production topology at a first point in time to create the first recovery topology, and recover the first application to a first computing system using the first recovery topology. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client system 202 and/or backup system 204), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a template database 122 for storing one or more templates that convert application production topologies to application recovery topologies. Exemplary system 100 may also include a topology database 124 for storing one or more application topologies.

Databases 120 in FIG. 1 may represent a portion of one or more computing devices. For example, databases 120 may represent a portion of backup system 204 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as backup system 204 in FIG. 2 computing system 610 in FIG. 6 and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client system 202 in communication with a backup system 204 via a network 208. In one embodiment, and as will be described in greater detail below, client system 202 may include an application 210 and a set of resources 212. Client system 202 generally represents any computing device and/or group of resources (e.g., service group) for providing application services. Examples of client system 202 include, without limitation, laptops, desktops, servers, virtual machines, embedded systems, cluster nodes, combinations of one or more of the same, cluster service groups, exemplary computing system 610 in FIG. 6, or any other suitable computing device or system. Application 210 generally represents any set of computer-executable instructions installed on client system 202, and set of resources 212 generally represents any type of computer resource that may support an application.

Backup system 204 generally represents any type or form of computing device that is capable of backing up application 210 and/or one or more storage devices on which application 210 stores data. Examples of backup system 204 include, without limitation, application servers and database servers configured to provide various database services and/or run certain software applications. As shown, backup system 204 may include discovery module 104, template-retention module 106, recovery module 108, command-identification module 110, template database 122, and topology database 124.

Network 208 generally represents any medium or architecture capable of facilitating communication or data transfer. Examples of network 208 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 208 may facilitate communication or data transfer using wireless or wired connections. In one embodiment, network 208 may facilitate communication between client system 202 and backup system 204.

As previously noted, an application may include a set of resources. Such resources may include storage devices such as disks, disk groups, a volume built in a disk group, a file system, a database, a network interface card, one or more IP addresses associated with the network card(s), the application program and associated code libraries, and/or any other suitable computing resource.

Figure 3:
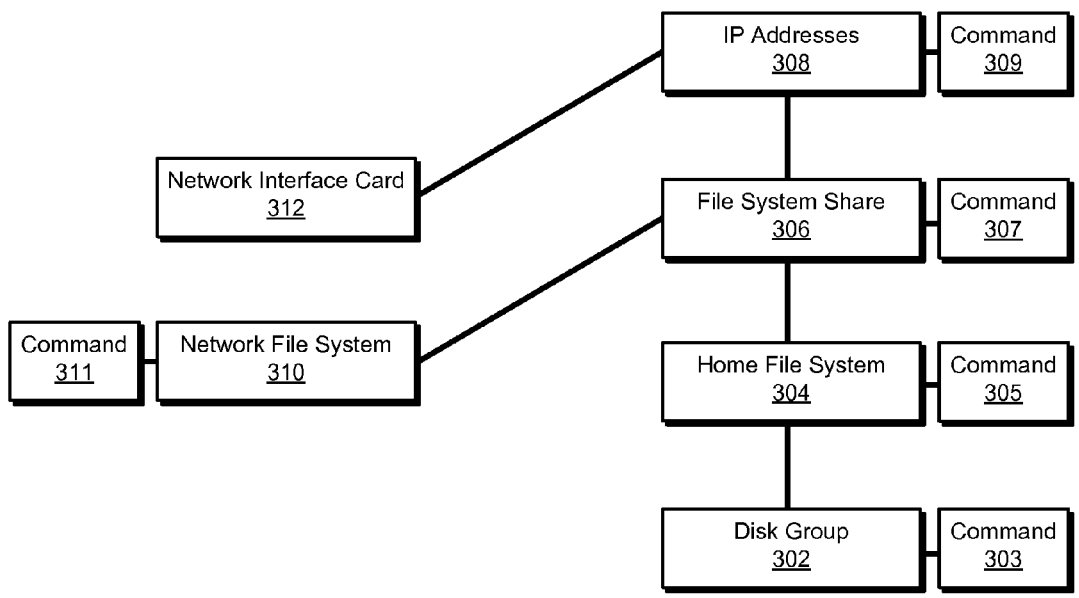
FIG. 3 is a block diagram of an exemplary application topology.

FIG. 3 shows a set of resources of an application as part of an application topology 300. As used herein, the phrase "application topology" generally refers to any description of physical and/or logical dependencies of an application. An application topology may be a production topology and/or a recovery topology. As used herein, the phrase "production topology" generally refers to any topology of an application that is running in a production environment. As used herein, the phrase "recovery topology" generally refers to any application topology used to recover an application.

Application topology 300 may identify a disk group 302, a home file system 304, a file system share 306, a network filesystem 310, a network interface card 312, and IP addresses 308 (e.g., IP addresses on all systems configured to run the application). As shown, application topology 300 may define dependencies of an application. For example, an application may depend on all of the resources identified in application topology 300. Application topology 300 may also define interdependencies of these resources. For example, home file system 304 may require disk groups 302 to be online before mounting. File system share 306 of home file system 304 may require home file system 304 to be mounted as well as the network filesystem daemons of network file system 310 to be running. IP addresses 308 may require file system share 306 to be online and network interface card 312 to be up. Thus, IP addresses 308, file system share 306, and home file system 304 all depend on other resources, while disk group 302, network interface card 312, and network file system 310 do not depend on other resources.

Embodiments of the instant disclosure may discover commands for on-lining and off-lining resources associated with an application and may include these commands in an application topology, such as application topology 300. As shown in FIG. 3, network disk group 302 may be associated with a command 303, home file system 304 may be associated with a command 305, file system share 306 may be associated with a command 307, IP addresses 308 may be associated with a command 309, and network file system 310 may be associated with a command 311.

Figure 4:
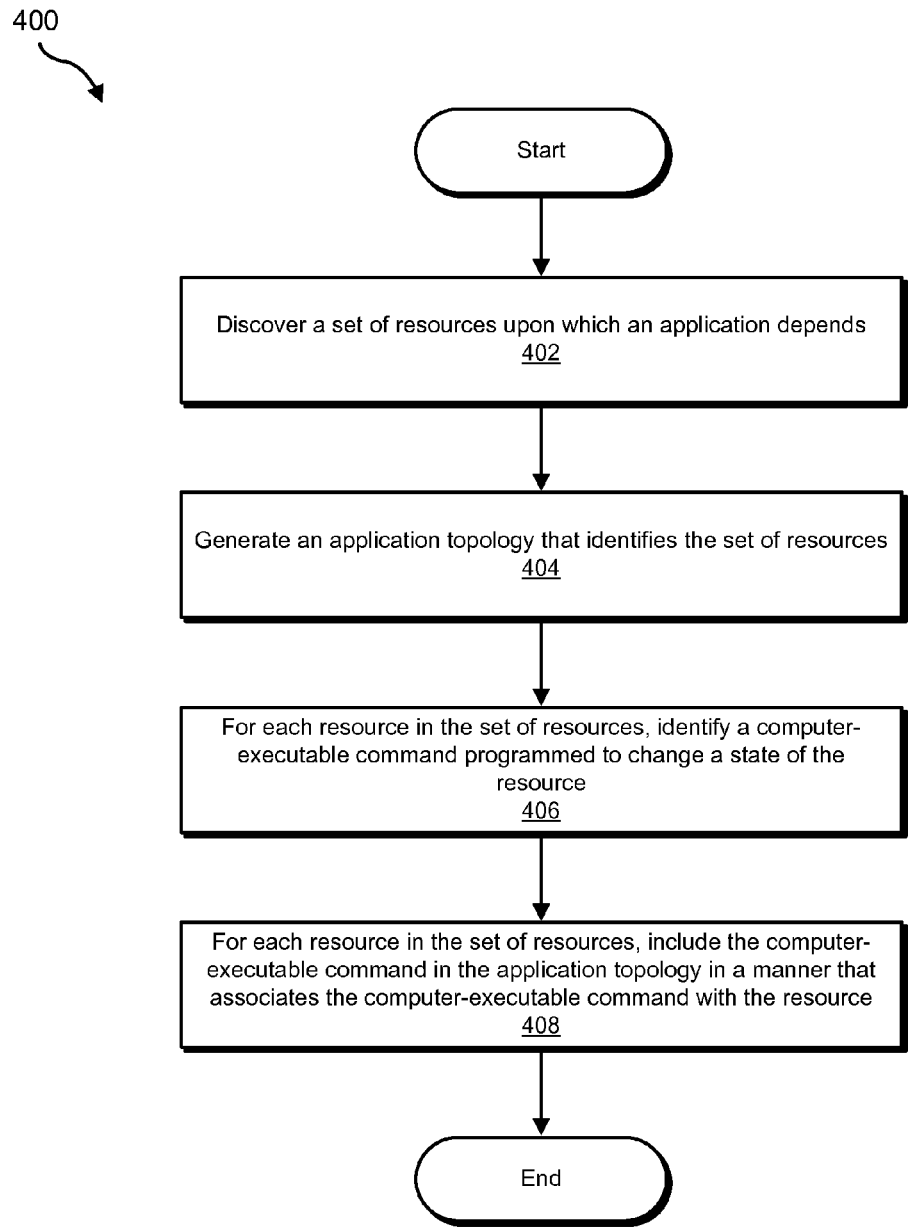
FIG. 4 is a flow diagram of an exemplary method for managing applications.

An exemplary process for discovering resources associated with an application and providing commands for these resources in an application topology is discussed in greater detail in FIG. 4. FIG. 4 is a flow diagram of an exemplary computer implemented method 400 for managing applications. The steps in FIG. 4 may be performed by any suitable computer-executable code and/or computing system. In some embodiments, the steps shown in FIG. 4 may be performed by one or more of the components of system 100 in FIG. 1 and/or system 200 in FIG. 2. At step 402 in FIG. 4, one or more of the systems described herein may discover a set of resources upon which an application depends. For example, discovery module 104 may discover set of resources 212 upon which application 210 depends.

Discovery module 104 may discover resources upon which an application depends in any suitable manner. For example, discovery module 104 may identify each specific resource defined during creation of an application. In such an embodiment, discovery module 104 may access each host of an application to identify such resources.

At step 404 in FIG. 4, one or more of the systems described herein may generate an application topology that identifies the set of resources. For example, discovery module 104 may generate application topology 300 to identify a set of resources 212 associated with application 210. Discovery module 104 may generate an application topology in any suitable way. In one example, discovery module 104 may contact a host (e.g., client system 202) of application 210 to identify specific resources defined during creation of application 210. Discovery module 104 may then define dependencies of the application and the resources to create an application topology.

At step 406 in FIG. 4, one or more of the systems described herein may, for each resource in the set of resources, identify a computer-executable command programmed to change a state of the resource (e.g., online the resource, offline the resource, etc.). For example, command-identification module 110 may identify computer-executable commands associated with the resources shown in FIG. 3. Computer-executable commands associated with the resources may be identified in a variety of ways. In one example, discovery module 104 may load a command-identification module that is specific to a resource to interrogate the resource for a command (or commands) for onlining and/or offlining the resource. In other embodiments, command-identification module 110 may access a command database to identify commands for onlining and/or offlining resources.

At step 408 in FIG. 4, one or more of the systems described herein may, for each resource in the set of resources, include one or more corresponding computer-executable commands in the application topology. For example, command-identification module 110 may, for each resource in the set of resources, include one or more computer-executable commands in the application topology in a manner that associates the computer-executable command with the resource. In some embodiments, command-identification module 110 may embed a computer-executable command in the application topology and may link the computer-executable command to the corresponding resource. Command-identification module 110 may use any other suitable algorithm to include a computer-executable command that changes the state of a resource in an application topology.

Step 406 and 408 (i.e., identifying commands and including them in an application topology) may be performed at any suitable time. In some embodiments, commands may be identified and added to the application topology while the application topology is being generated (e.g., during discovery of resources of an application). In other embodiments, commands may be identified and added to the application topology after the topology has been created.

Generating an application topology that includes commands for modifying the states of resources of an application may be useful in a variety of contexts. For example, a backup system may need to start and/or stop (i.e., shut down) a protected application (e.g., to recover the application, to migrate the application, etc.). Starting and/or stopping an application may be done by traversing an application topology and executing commands embedded in the application topology.

For example, recovery module 108 on backup system 204 may start application 210 on client system 202 by starting each resource on which application 210 depends and also starting application 210. Recovery module 108 may traverse application topology 300 to identify the resources associated with application 210. For each resource identified in application topology 300, recovery module 108 may check to see whether the resource is in the desired state (e.g., online), and if the resource is not in the desired state, recovery module 108 may execute a command associated with the resource to online the resource. For example, if recovery module 108 discovers that home file system 304 is offline, recovery module 108 may execute command 305 to online home file system 304. Such a recovery process may reduce the need for resource-type specific knowledge on the recovery host. It may also reduce manual intervention when a user tries to recover the application.

Figure 5:
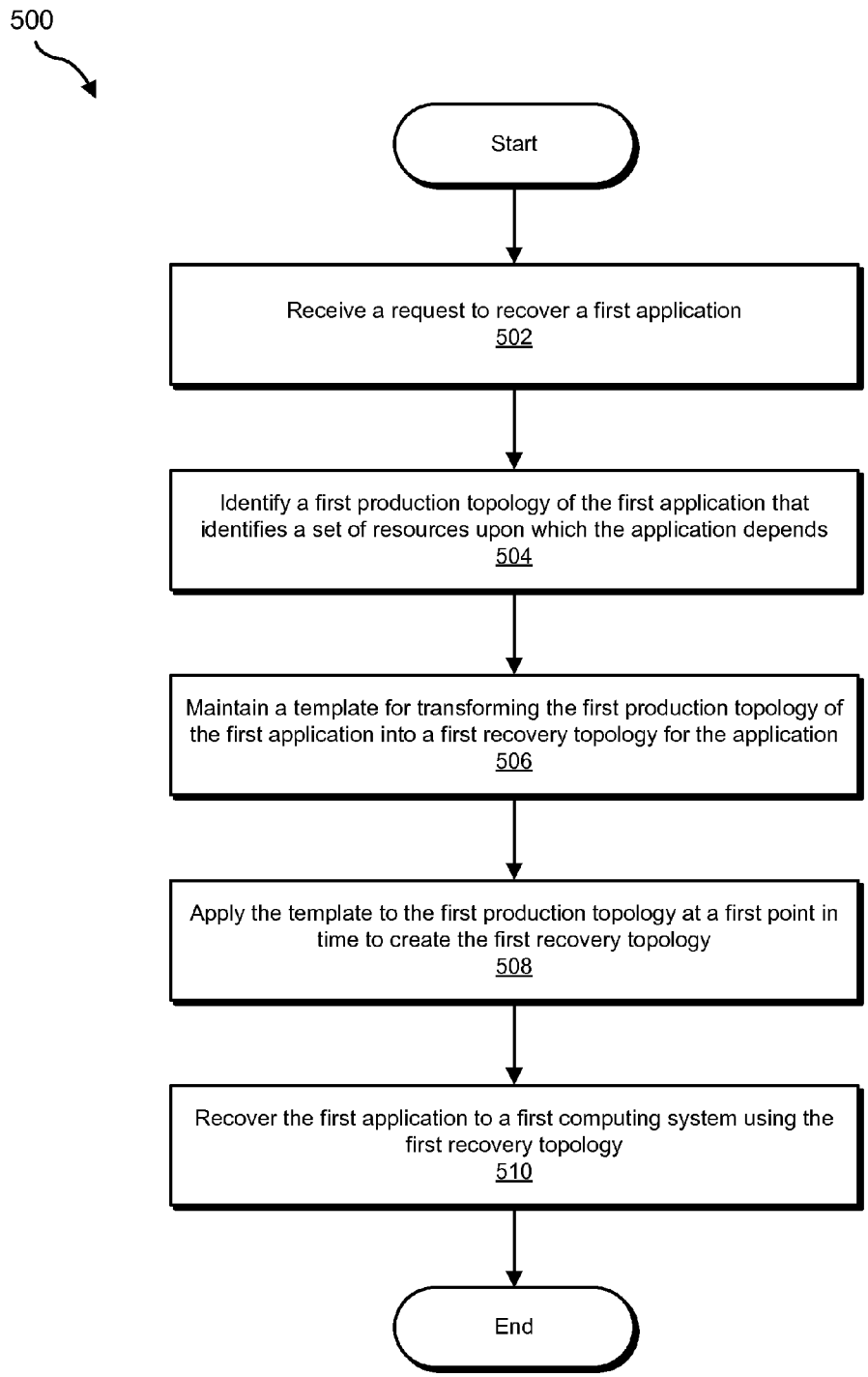
FIG. 5 is a flow diagram of another exemplary method for managing applications.

While FIG. 4 highlights an exemplary method for creating an application topology that includes resource-related commands, FIG. 5 describes an exemplary process for transforming an application's production topology into a recovery topology. The steps shown in FIG. 5 may be performed by any suitable computer executable code and/or computing system. In some embodiments, the steps shown in FIG. 5 may be performed by one or more of the components of system 100 in FIG. 1 and/or system 200 in FIG. 2.

At step 502 in FIG. 5, one or more of the systems described herein may receive a request to recover a first application. For example, recovery module 108 may receive a request to recover application 210. Recovery module 108 may receive a request to recover an application in a variety of contexts. For example, recovery module 108 may receive a request to recover application 210 after application 210 fails and/or one or more resources of application 210 fail. Additionally or alternatively, recovery module 108 may receive a request to recover application 210 as part of a trial recovery and/or as a part of a recovery to multiple different systems for development and/or testing.

At step 504 in FIG. 5, one or more of the systems described herein may identify a first production topology of the first application that identifies a set of resources upon which the application depends. For example, recovery module 108 may identify a production topology, such as topology 300, of application 210. Recovery module 108 may identify production topology 300 by querying topology database 124 and/or in any other suitable manner.

At step 506 in FIG. 5, one or more of the systems described herein may maintain a template for transforming first production topology of the application into a recovery topology for the application. For example, template-retention module 106 may maintain a template for transforming the production topology of application 210 into a recovery topology for application 210. Such a template may include any information for mapping the first production topology to the first recovery topology. Such information may include values for mapping production resources of the application to recovery resources of the application. As an example, the template may include information for modifying a production topology reference to a first host to refer to a second host in the recovery topology. As another example, the template may include information that indicates that a reference to a mount point in the production topology should be transformed to refer to a different mount point in the recovery topology.

Template-retention module 106 may maintain the template in a variety of ways and in a variety of contexts. For example, template-retention module 106 may maintain the template by saving a recovery mapping (i.e., changes made to a production topology to enable recovery) used during a first recovery. The saved template may then be used in later recovery operations. The template may be populated with values from the production topology and/or user input. In some embodiments, a user may provide input for the template when a recovery using the template would override production data or potentially cause other issues. A user may also provide input for the template to change how and where an application is recovered. For example, template-protection module 106 may retrieve the template, present at least a portion of the information stored in the template to a user via a graphical user interface, and may receive, via the graphical user-interface, input that modifies at least one value stored in the template.

In some embodiments, a template may have some fields that are required and some that are optional. Required fields cannot be left null, while optional fields may be populated with values from the production topology.

Maintaining templates that map production topologies to recovery topologies may be facilitate application recovery in a variety of contexts. In some embodiments, it may be desirable to recover application many times, and a template maintained from a first recovery may be used in future recoveries. For example, a user may want to recover the same application multiple times to the same system. Recovery module 108 may reuse a template from the first recovery in each subsequent recovery. In other embodiments, a user may want to recover the same application multiple times, but to different systems. In such embodiments, recovery module 108 may use a recovery template for an application to create multiple recovery topologies and may use the recovery topologies to recover the application to multiple systems.

At step 508, one or more of the systems described herein may apply the template to the first production topology at a first point in time to create the first recovery topology. For example, recovery module 108 may apply the template to topology 300 to create a recovery topology.

Recovery module 108 may apply the template to the production topology by using the template to transform the production topology into a recovery topology. The template may provide recovery module 108 with information needed to change one or more values in the production topology to values for the recovery topology. For example, the template may indicate that a reference to a resource in the production topology should be changed to refer to a different resource in the recovery topology.

A production topology may be transformed into a recovery topology in a variety of ways. In some embodiments, the template may include transformation commands. For example, the template may be implemented using XSL Transformations ("XSLT"). In such embodiments, the production topology may include an extensible markup language ("XML") document. Recovery module 108 may use the template (in this example, an XSLT document) to process the production topology (an XML document) to create the recovery topology as a new XML document. Recovery module 108 may also use any other suitable transformation language, regular expressions, and/or any other mechanism to transform the production topology into the recovery topology.

In some embodiments, a production topology may be transformed into a recovery topology to recover an instance of the application that corresponds to the production topology (i.e., the application represented by the production topology). Additionally or alternatively, a production topology of an application other than the application used to create the template may be transformed into a recovery topology using the template. In such embodiments, only transformation steps that are relevant to the new application may be performed, and any transformation steps that are irrelevant (i.e., data in the template that does not correspond to anything in the application topology of the new application) may be ignored. If the transformation does not result in a complete mapping, the user may be provided an opportunity to complete the mapping by filling out the empty parts of the template.

At step 510 in FIG. 5, one or more of the system described herein may recover the application to a computing system using the recovery topology. For example, recovery module 108 may recover application 210 to client system 202 using the recovery topology created in step 508. As previously mentioned, application 210 may be recovered in a variety of contexts. For example, application 210 may be recovered in response to a software or hardware failure, as part of a trial recovery, and/or in a variety of other situations.

Figure 6:
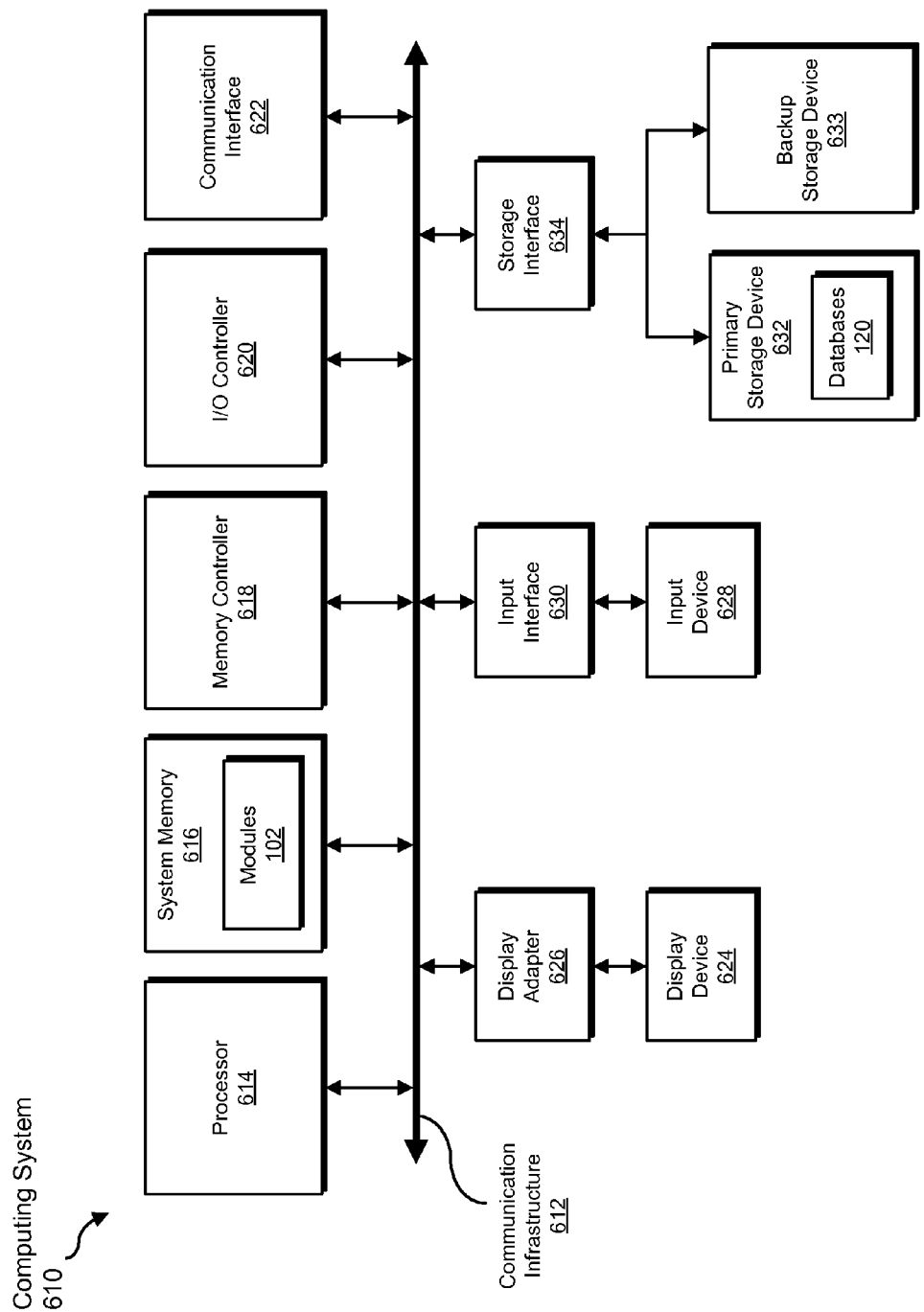
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, identifying, maintaining, applying, recovering, modifying, retrieving, presenting, discovering, generating, onlining, storing, including, changing, traversing, reading, and determining steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as receiving, identifying, maintaining, applying, recovering, modifying, retrieving, presenting, discovering, generating, onlining, storing, including, changing, traversing, reading, and determining.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the receiving, identifying, maintaining, applying, recovering, modifying, retrieving, presenting, discovering, generating, onlining, storing, including, changing, traversing, reading, and determining steps described herein.

I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, identifying, maintaining, applying, recovering, modifying, retrieving, presenting, discovering, generating, onlining, storing, including, changing, traversing, reading, and determining steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, identifying, maintaining, applying, recovering, modifying, retrieving, presenting, discovering, generating, onlining, storing, including, changing, traversing, reading, and determining steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the receiving, identifying, maintaining, applying, recovering, modifying, retrieving, presenting, discovering, generating, onlining, storing, including, changing, traversing, reading, and determining steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
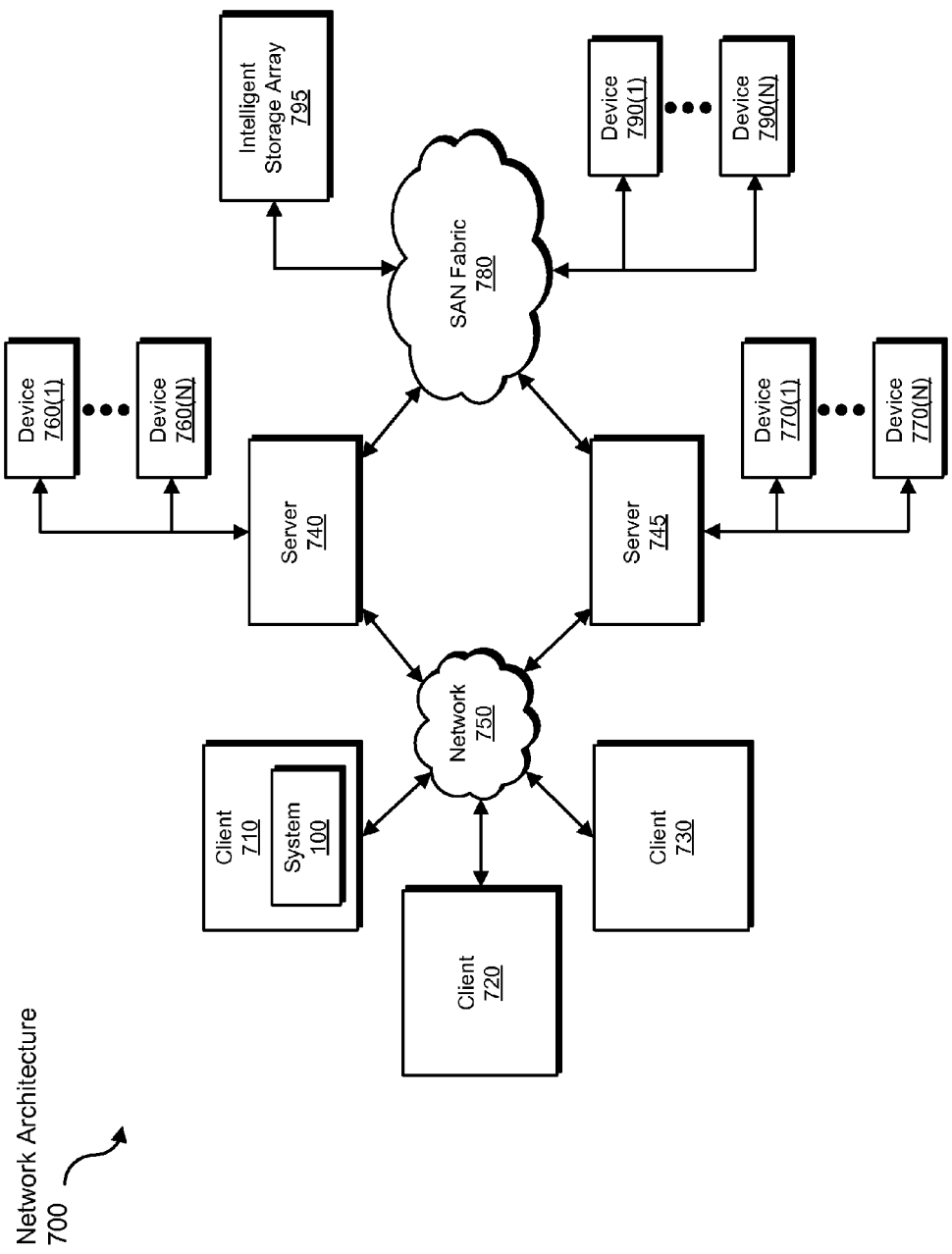
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the receiving, identifying, maintaining, applying, recovering, modifying, retrieving, presenting, discovering, generating, onlining, storing, including, changing, traversing, reading, and determining steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for managing applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a recovery topology that represents a production application and its resources into a recovery topology that represents a recovered instance of the application and its resources.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing applications, at least a portion of the method being performed by a computing device comprising at least one processor, the method comprising:
   discovering a set of resources upon which an application depends;
   generating an application topology that identifies the set of resources;
   for each resource in the set of resources:
      identifying a computer-executable command programmed to change a state of the resource;
      including the computer-executable command in the application topology in a manner that associates the computer-executable command with the resource.

2. The computer-implemented method of claim 1, further comprising:
   receiving a request to change a state of the application;
   changing the state of the application by:
      traversing the application topology to identify a resource whose state needs to be changed;
      reading, from the application topology, the computer-executable command programmed to change the state of the resource;
      changing the state of the resource by executing the computer-executable command.

3. The computer-implemented method of claim 2, wherein:
   the request to change the state of the application comprises a request to recover the application;
   changing the state of the resource comprises onlining the resource.

4. The computer-implemented method of claim 2, wherein:
   the request to change the state of the application comprises a request to shut down the application;
   changing the state of the resource comprises offlining the resource.

5. The computer-implemented method of claim 2, wherein traversing the application topology to identify the resource whose state needs to be changed comprises:
   determining that the resource is not in a predetermined state.

6. The computer-implemented method of claim 1, wherein at least one resource in the set of resources comprises a file system.

7. The computer-implemented method of claim 1, wherein at least one resource in the set of resources comprises a database.

8. The computer-implemented method of claim 1, wherein identifying the computer-executable command and including the computer-executable command in the application topology is performed while the application topology is being generated.

9. A system comprising:
   a discovery module programmed to:
      discover a set of resources upon which an application depends;
      generate a first production topology that identifies the set of resources;
   a command-identification module programmed to, for each resource in the set of resources:
      identify a computer-executable command programmed to change a state of the resource;
      include the computer-executable command in the first production topology in a manner that associates the computer-executable command with the resource;
   a template-retention module programmed to maintain a template for transforming the first production topology of the application into a recovery topology for the application, the template comprising information for mapping the first production topology to the recovery topology;
   a recovery module programmed to:
      receive a request to recover the application;
      identify the first production topology;
      apply the template to the first production topology at a point in time to create the recovery topology;
      recover the application to a computing system using the recovery topology;
   at least one processor programmed to execute the discovery module, the command-identification module, the template-retention module, and the recovery module.

10. The system of claim 9, wherein the template-retention module is programmed to maintain the template by:
    storing a set of changes that map the first production topology to the recovery topology.

11. The system of claim 9, wherein the template-retention module is programmed to:
    retrieve the template;
    present at least a portion of information stored in the template to a user via a graphical user interface;
    receive, via the graphical user interface, input that modifies at least one value stored in the template.

12. The system of claim 9, wherein:
    the first production topology and the recovery topology comprise markup-language documents;
    the template comprises a markup-language transformation document.

13. A non-transitory computer-readable medium comprising one or more computer-executable instructions that, when executed by at least one processor of a computing device, cause the computing device to:
    discover a set of resources upon which an application depends;
    generate an application topology that identifies the set of resources;
    for each resource in the set of resources:
       identify a computer-executable command programmed to change a state of the resource;
       include the computer-executable command in the application topology in a manner that associates the computer-executable command with the resource.

14. The non-transitory computer-readable medium of claim 13, wherein the one or more computer-executable instructions are further programmed to cause the computing device to:
  receive a request to change a state of the application;
  change the state of the application by:
    traversing the application topology to identify a resource whose state needs to be changed;
    reading, from the application topology, the computer-executable command programmed to change the state of the resource;
    changing the state of the resource by executing the computer-executable command.

15. The non-transitory computer-readable medium of claim 14, wherein:
  the request to change the state of the application comprises a request to recover the application;
  the one or more computer-executable instructions are further programmed to change the state of the resource by onlining the resource.

16. The non-transitory computer-readable medium of claim 14, wherein:
  the request to change the state of the application comprises a request to shut down the application;
  the one or more computer-executable instructions are further programmed to change the state of the resource by offlining the resource.

17. The non-transitory computer-readable medium of claim 14, wherein the one or more computer-executable instructions are programmed to traverse the application topology to identify the resource whose state needs to be changed by:
  determining that the resource is not in a predetermined state.

18. The non-transitory computer-readable medium of claim 13, wherein at least one resource in the set of resources comprises a file system.

19. The non-transitory computer-readable medium of claim 13, wherein at least one resource in the set of resources comprises a database.

20. The non-transitory computer-readable medium of claim 13, wherein the one or more computer-executable instructions are programmed to identify the computer-executable command and include the computer-executable command in the application topology after the application topology is generated.

* * * * *